United States Patent
Cass

Patent Number: 5,467,738
Date of Patent: Nov. 21, 1995

[54] ANT-FREE PET DISHES

[76] Inventor: Joanie E. Cass, 7279 7th St., Canutillo, Tex. 79835

[21] Appl. No.: 169,411

[22] Filed: Dec. 20, 1993

[51] Int. Cl.⁶ .............................. A01K 5/01; A01K 7/00
[52] U.S. Cl. .................... 119/61; 119/51.12; 119/51.5
[58] Field of Search ............................... 119/51.12, 51.5, 119/61, 63

[56] References Cited

U.S. PATENT DOCUMENTS

| | | | |
|---|---|---|---|
| 2,841,114 | 7/1958 | Grant | 119/61 |
| 4,421,059 | 12/1983 | Cousino | 119/51.12 |
| 4,671,210 | 6/1987 | Robinson et al. | 119/51.12 |
| 4,953,506 | 9/1990 | Sanders | 119/61 |
| 5,125,363 | 6/1992 | McGaha | 119/61 |
| 5,222,461 | 6/1993 | Haynes | 119/51.12 |
| 5,253,609 | 10/1993 | Partelow | 119/61 |
| 5,277,149 | 1/1994 | East | 119/61 |

*Primary Examiner*—John G. Weiss

[57] ABSTRACT

Ant-free dishes for use by pets comprising, a lower dish positionable in a horizontal plane and defining a lower liquid reservoir therein; an upper food containing section comprising one or more upper dishes disposed vertically and in parallel relationship above the lower dish; and a support member extending vertically between the lower dish and the upper food containing section wherein the support member allows for the lower dish and the upper food containing section to be maintained in fixed vertical alignment thereto.

3 Claims, 4 Drawing Sheets

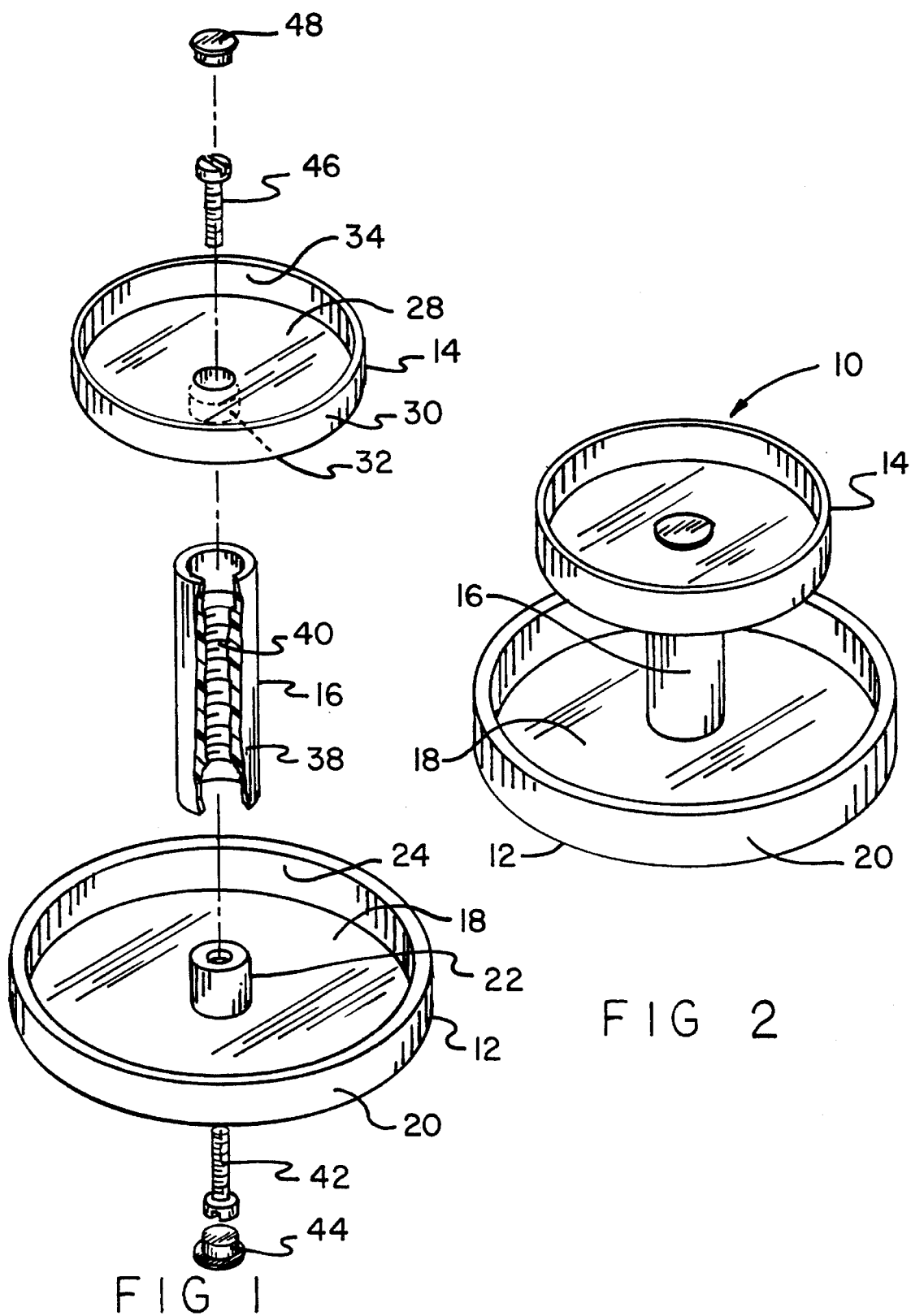

ANT-FREE PET DISHES

BACKGROUND OF THE INVENTION

1. Field of the Invention

The present invention relates to ant-free pet dishes and more particularly pertains to pet dishes which can be left unmonitored for an extended period of time with risk of insect infestation.

2. Description of the Prior Art

The use of animal feeding dishes is known in the prior art. More specifically, animal feeding dishes heretofore devised and utilized for the purpose of retarding the contamination of the food by crawling insects are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,000,124 to Bergen, a pet bowl which can be slidingly raised above the ground to inhibit insects.

U.S. Pat. Nos. 4,802,302 to Alnafissa and 5,109,800 to Williams both describe pet bowls provided with insect trapping adhesive to prevent insects from reaching the food.

The use of a water-filled moat to reduce pest infestation in animal feeding dishes is suggested in U.S. Pat. Nos. 5,069,166 to Ahuna and 5,031,575 to Phillips.

In this respect, ant-free pet dishes according to the present invention substantially depart from the conventional concepts and designs of the prior art, and in doing so provide an apparatus primarily developed for the purpose of providing pet dishes which can be left unmonitored for an extended period of time without risk of insect infestation.

Therefore, it can be appreciated that there exists a continuing need for new and improved ant-free pet dishes which can be left unmonitored for an extended period of time without risk of insect infestation. In this regard, the present invention substantially fulfills this need.

SUMMARY OF THE INVENTION

In view of the foregoing disadvantages inherent in the known types of animal feeding dishes now present in the prior art, the present invention provides improved ant-free pet dishes. As such, the general purpose of the present invention, which will be described subsequently in greater detail, is to provide new and improved ant-free pet dishes and method which has all the advantages of the prior art and none of the disadvantages.

To attain this, the present invention essentially comprises a lower dish, an upper dish, and coupling components. The lower dish has a circular plate with a first diameter positionable in a horizontal plane wherein the plate has an upward peripheral wall and an upwardly directed central projection with an axial bore therethrough. The vertical height of the projection and the wall are essentially the same, and the plate, wall, and projection are integrally fabricated. The region above the plate and between the wall and projection defines a liquid reservoir therein. The upper dish has a circular plate with a second diameter the same or less than the first diameter positionable in a horizontal plane, wherein the plate has an upward peripheral wall and a downwardly directed central projection with an axial bore therethrough. The plate, wall, and projection are integrally fabricated with the region above the plate and within the wall, thus defining a liquid reservoir therein. The coupling components releasably join the lower and upper dishes, and include a vertically oriented tube having a lower extent of a diameter to receivingly accept the projection of the lower dish, an upper extent of a diameter to receivingly accept the projection of the upper dish, and a threaded central extent therebetween. The coupling components further include a lower bolt extending through the bore of the lower dish and into the threaded extent of the tube, a lower cap positionable about the lower extent of the bore of the lower dish, an upper bolt extending through the bore of the upper dish and into the threaded extent of the tube, and an upper cap positionable about the upper extent of the bore of the upper dish.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved ant-free pet dishes which have all the advantages of the prior art animal feeding dishes and none of the disadvantages.

It is another object of the present invention to provide new and improved ant-free pet dishes which may be easily and efficiently manufactured and marketed.

It is a further object of the present invention to provide new and improved ant-free pet dishes which are of durable and reliable constructions.

An even further object of the present invention is to provide new and improved ant-free pet dishes which are susceptible of a low cost of manufacture with regard to both materials and labor, and which accordingly are then susceptible of low prices of sale to the consuming public, thereby making such ant-free pet dishes economically available to the buying public.

Still yet another object of the present invention is to provide new and improved ant-free pet dishes which provide in the apparatuses and methods of the prior art some of the advantages thereof, while simultaneously overcoming some of the disadvantages normally associated therewith.

Even still another object of the present invention is to provide ant-free pet dishes which can be left for an extended period of time unmonitored without risk of contamination of the pet food by ants, crawling insects, or other pests or the like.

Lastly, it is an object of the present invention to provide new and improved ant-free dishes for use by pets comprising a lower dish positionable in a horizontal plane and defining a lower liquid reservoir therein; an upper food containing section comprising one or more upper dishes disposed vertically and in parallel relationship above the lower dish; and a support member extending vertically between the lower dish and the upper food containing section wherein the support member allows for the lower dish and the upper food containing section to be maintained in fixed vertical alignment thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective view of the preferred embodiment of the ant-free pet dish constructed in accordance with the principles of the present invention.

FIG. 2 is a respective illustration of the device shown in FIG. 1 but in the assembled condition.

The same reference numerals refer to the same parts through the various Figures.

DESCRIPTION OF THE PREFERRED EMBODIMENT

Figure 3:
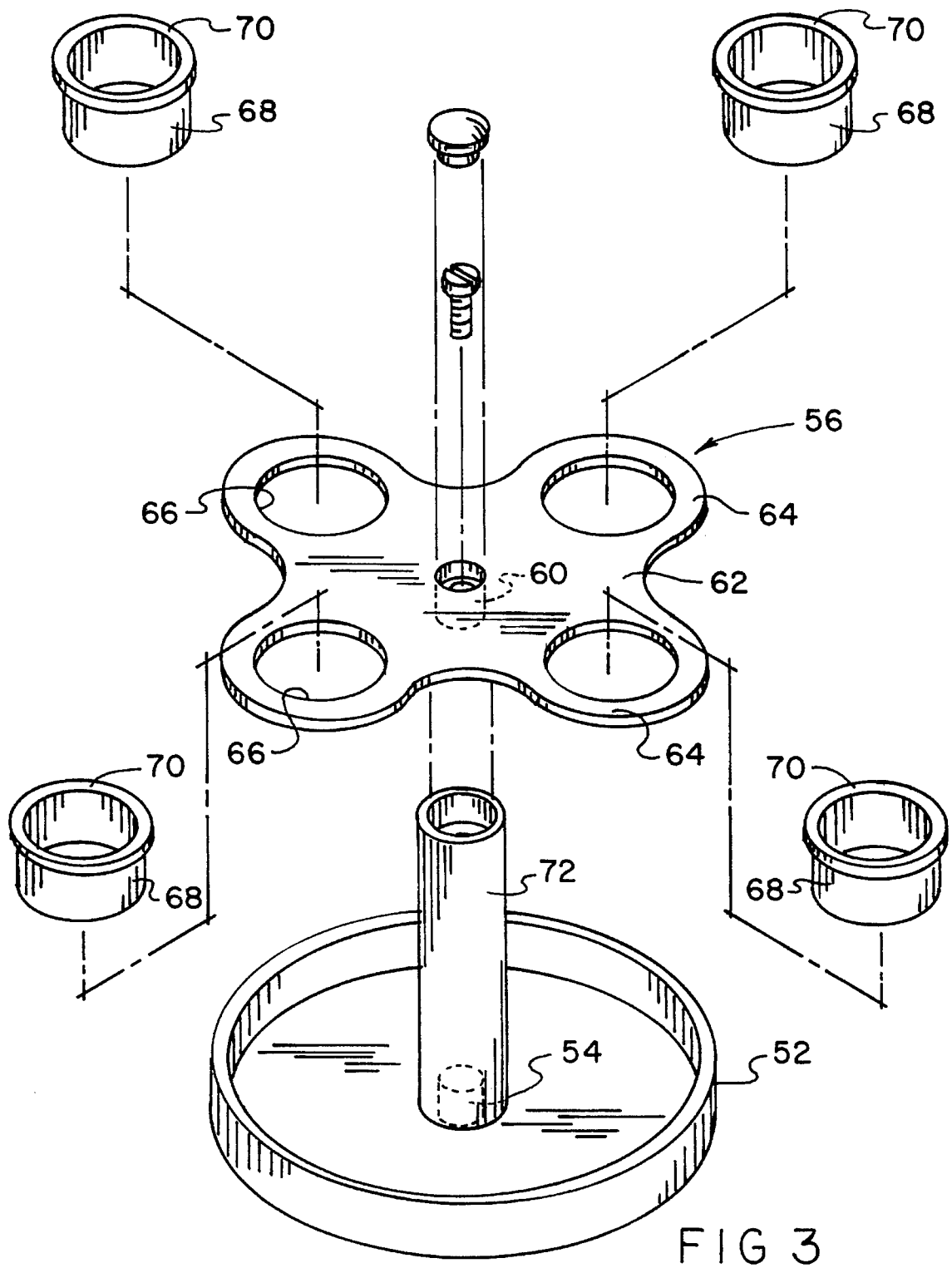
FIG. 3 is an exploded perspective illustration of an alternate embodiment of the invention.

With reference now to the drawings, and in particular to FIG. 1 thereof, the preferred embodiment of the new and improved ant-free pet dishes embodying the principles and concepts of the present invention and generally designated by the reference numeral 10 will be described.

Specifically, it will be noted in the various Figures that there are provided ant-free dishes 10 for use by pets which can be left unmonitored for an extended period of time without the risk of insect infestation. In its broadest of terms, the invention comprises a lower dish 12, an upper dish 14, and coupling components 16 therebetween.

Specifically, the lower dish 12 has a circular plate 18 with a first diameter positionable in a horizontal plane. The plate 18 has an upward peripheral wall 20 and an upwardly directed central projection 22 with an axial bore therethrough. The vertical height of the projection 22 and the wall 20 are essentially the same. The plate, wall, and projection are further integrally fabricated, such that the region above the plate and between the wall and projection define a liquid reservoir 24 therein. This liquid reservoir 24 defined by the bottom dish is preferably filled with water by the pet owner.

The upper dish 14 has a circular plate 28 with a second diameter not greater than the first diameter and is also positionable in a horizontal plane. The plate 28 has an upward peripheral wall 30 and a downwardly directed central projection 32 with an axial bore therethrough. The plate, wall, and projection are integrally fabricated with the region above the plate and within the wall, defining a reservoir 34 therein. Within the reservoir of the upper dish, it is contemplated that the pet owner would place pet consumables such as food or drinking water or milk.

The coupling components 16 function to releasably join the lower and upper dishes. Included within the coupling components are a vertically oriented tube 38 having a lower extent of a diameter to receivingly accept the projection 22 of the lower dish 12, an upper extent of a diameter to receivingly accept the projection 32 of the upper dish. Further included is a threaded central extent 40 therebetween. The coupling components further include a lower bolt 42 extending through the bore of the lower dish and into the threaded extent of the tube, a lower cap 44 positionable about the lower extent of the bore of the lower dish, an upper bolt 46 extending through the bore of the upper dish and into the threaded extent of the tube, and an upper cap 48 positionable about the upper extent of the bore of the upper dish.

In operation the pet food, preferably placed in the upper dish 14, is located directly above the lower dish 12 which is preferably filled with water. Since the food is located a substantial distance above the ground and above a moat of water, any ant or crawling insect would attempt to approach the food but instead would become trapped in the lower water-filled dish.

In a second embodiment as shown in FIG. 3, the ant-free dishes for use by pets provide for multiple quantities of consumables to be offered simultaneously to the pet. In the second embodiment the lower dish 52 preferably contains water and is essentially the same as the lower dish of the preferred embodiment. The lower dish 52 is positionable in a horizontal plane thus defining a lower liquid reservoir therein. The lower dish has an upwardly extending projection 54 about the center of the dish with an axial bore therethrough.

An upper food containing section 56 comprises one or more upper dishes 58, four in this embodiment, and is disposed vertically and in parallel relationship above the lower dish. The upper section 56 has a downwardly extending projection 60 about the center of the upper section with an axial bore therethrough. The upper food containing section comprises a horizontally disposed upper base member 62 having an undulant periphery with a plurality of protrusions 64 extending outwardly and in spaced equidistant and symmetrical relationship to the center of the base member. The downwardly extending projection 60 with an axial bore therein is disposed about the center of the upper base member 62. Each protrusion contains an aperture 66 of a diameter adapted to encompass a circular food dish 68 therein.

Each food dish has a circular plate, an upward extending peripheral wall, and an outwardly extending annular flange 70 at the upper terminus of the wall adapted to hold the food dish in proximate relationship to the base member 62 upon the placement of the food dish with an aperture thereof. In FIG. 3, four such protrusions, apertures, and corresponding dishes are shown; however, it is contemplated that any number of such is feasible and therefore encompassed within the scope of the invention.

The coupling components of the second embodiment are of essentially identical construction and fabrication as those shown in the preferred embodiment, including a cylindrical tube 72 with unthreaded upper and lower extents with a threaded central extent therebetween, upper and lower bolts, and upper and lower caps.

Figure 4:
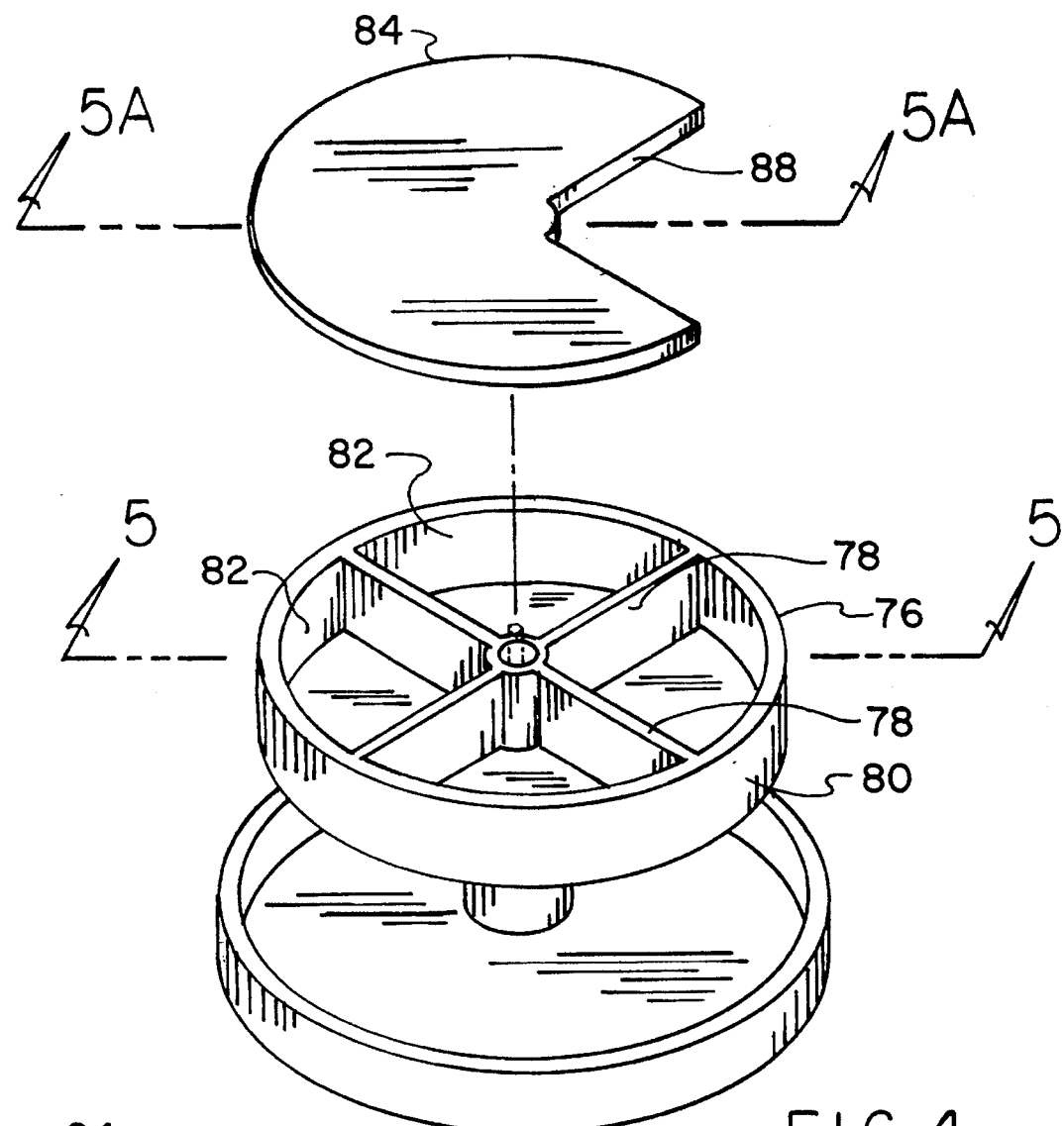
FIG. 4 is an exploded perspective illustration of another alternate embodiment of the invention.
Figure 5A:
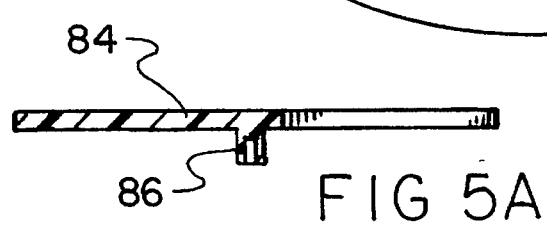
FIG. 5A is a cross-sectional view taken along line 5A—5A of FIG. 4.
Figure 5:
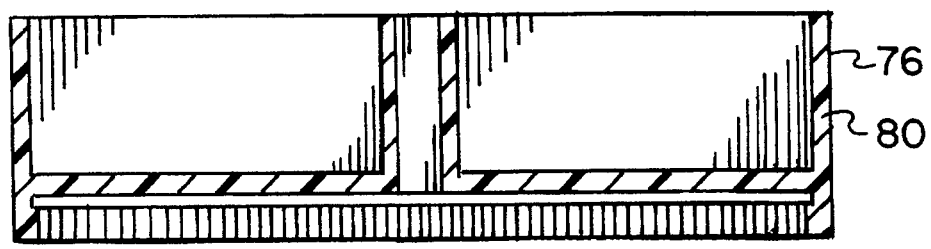
FIG. 5 is a cross-sectional view taken along line 5—5 of FIG. 4.

As shown in FIGS. 4 and 5, a third embodiment includes a rotatable upper dish 76. It is contemplated that the upper food containing section comprises a horizontally disposed upper circular dish 76 having upstanding walls 78 and 80 across the diameter and about the periphery of the dish. This defines a plurality of wedge-shaped upper partitions 82 therein. The projection with an axial bore therein is disposed about the center of the upper dish as is the prior embodiment. The upper circular dish 76 is further provided with a demountable cover member 84 which is fixedly held about a stationary axial shaft 86 extending downwardly through the center of the upper dish. In this manner, the upper dish 76 is freely rotating about the axis of the shaft. The cover member 84 has a cutout 88 which selectively exposes a single partition 82 in the upper circular dish. Therefore, in use, the pet owner may completely fill all partitions with pet food, treats, water, or other consumable and orient the cover such that the partition the owner wishes to allow the pet to eat is exposed. When the owner is ready to give the pet another portion of food or water, the owner may simply rotate the dish about the axis of the shaft and therefore expose a new fresh partition for the pet to eat.

Figure 6:
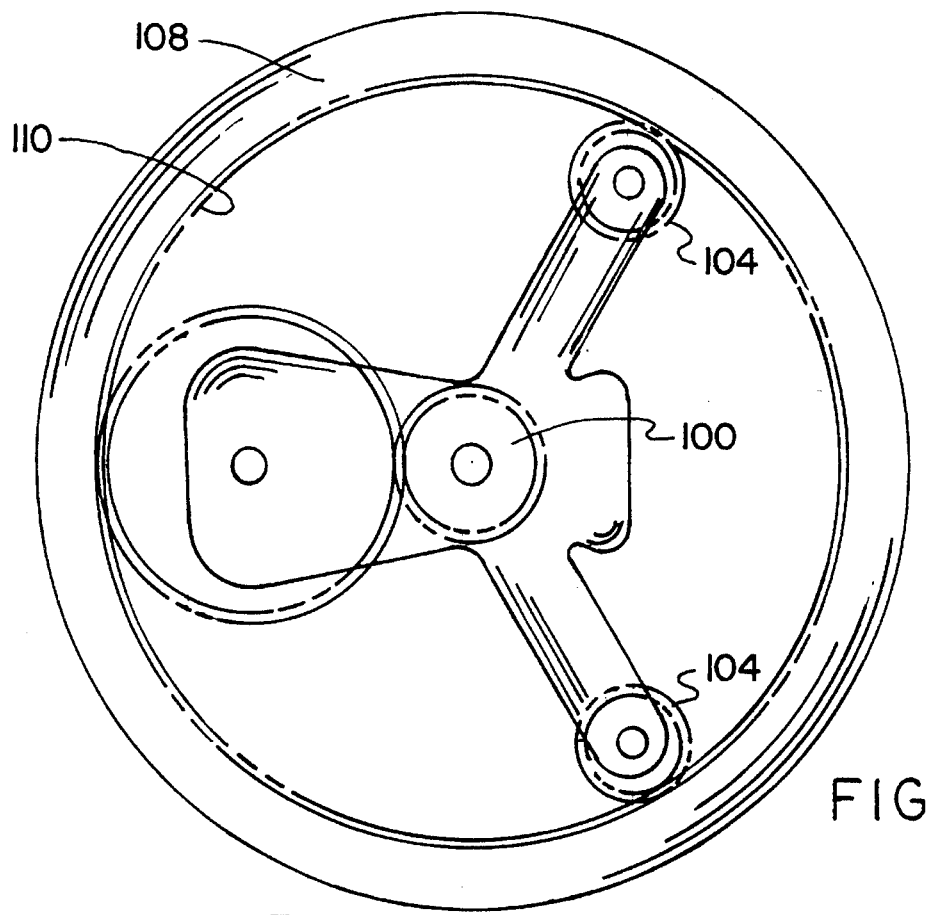
FIG. 6 is a plan view of yet another alternate embodiment of the invention.
Figure 7:
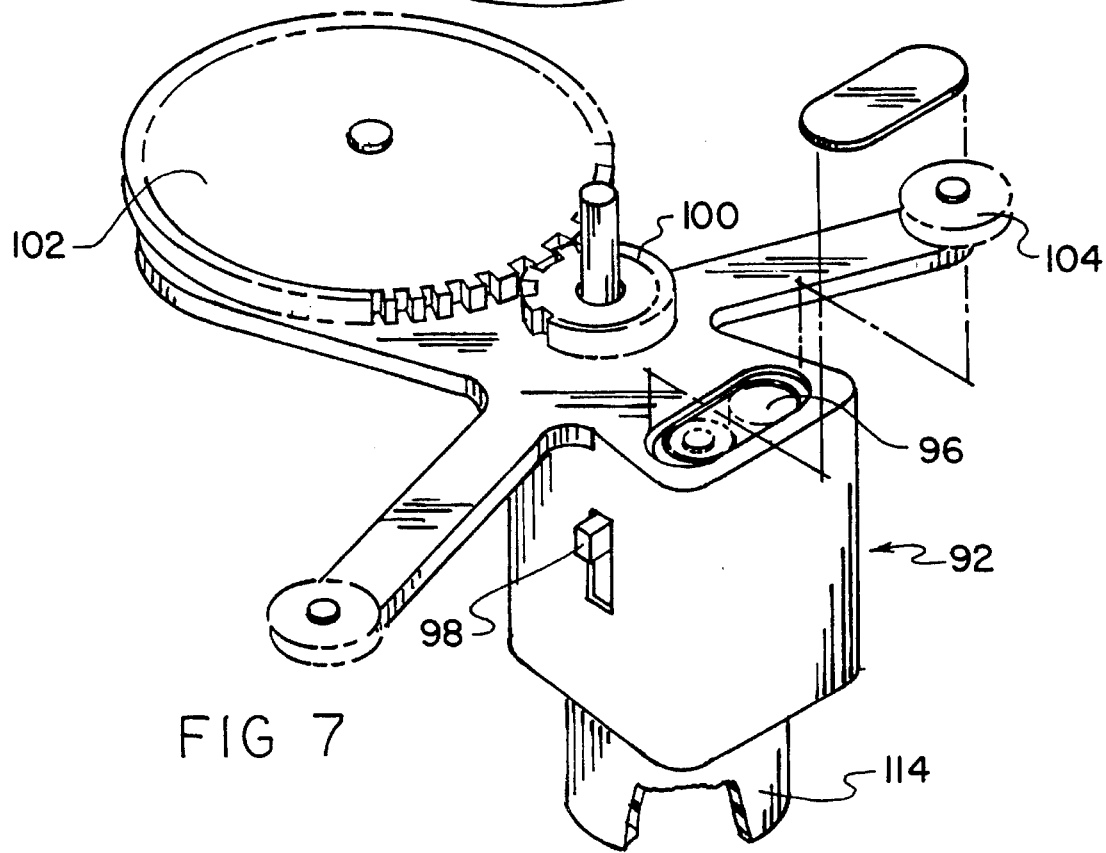
FIG. 7 is a perspective illustration of the device shown in FIG. 6.

The ant-free pet dishes may also include a motor assembly 92 acting to impart rotation to the upper dish. Note FIGS. 6 and 7. The motor assembly 92 comprises a timer, not shown, an electrical current supply 96, a switch 98, a toothed drive gear 100, a toothed idler gear 102, and a pair of antifriction rollers 104. The electrical supply 96 is preferably batteries but could include means for connection to home alternating current supply. The current imparts rotation to the drive gear 100 which in turn causes the larger idler gear 102 to move in the opposite direction. The upper dish 108 further comprises, along the bottom periphery thereof, a toothed ring gear 110 in cooperating mesh with the idler gear 102 of the motor assembly, such that upon rotation of the idler gear 102 of the motor assembly the upper dish 108 is caused to rotate as well. The antifriction rollers 104 also engage the bottom of the upper dish and act to impart even rotation of the dish upon activation of the motor assembly by the switch 98. A lower apertured post 114 fits over an upstanding post in a lower dish as in the prior embodiments.

The pet owner may therefore completely fill all partitions of the dish of the present invention and set the timer for activation of the motor at specified times while the owner is not available to monitor the feeding of the animal(s). At the times specified by the owner, the dish will then rotate beneath the cover to thus expose the next adjacent filled partition of the dish for consumption by the pet. The owner is therefore free to leave the pet alone for an extended period of time and under the assurance that the pet will be provided with fresh quantities of food and water at all feeding times and additionally without fear of ant or other insect infestation.

Pets provide comfort, security and love but they require a great deal of care in return. Pet owners cannot leave their pets for an extended period of time without tending to the pets' needs in their absence. They require food and water, and if possible, a cuddle or two while the owners are not at home. A dog requires even more care than a cat. A cat owner can go away for a few days and leave a clean litter box and a good supply of food. In either case, when the pet owner leaves a dish of food for the dog or cat, ants can get into the food, especially during the warm weather when people tend to go away on day trips quite frequently. It is a problem trying to keep the ants out of the pet dish, and this often results in the pet owner throwing out perfectly good pet food because it has become infested with ants.

The present invention is a two-tiered plastic pet dish, with two bowls that are connected via two PVC pipes, which are screwed into each layer. The pet owner puts Water in the lower tier and the pet food in the upper tier. Since ants will not travel through the water to get to the pet food, the pet food is protected.

This product should appeal to any pet owners who want to protect their pet's food from ant infestation and avoid wasting pet food during the warm weather.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ant-free dish for use by pets comprising:

a lower dish positionable in a horizontal plane and defining a lower liquid reservoir therein, the lower dish having an upwardly extending projection about the center of the dish with an axial bore therethrough;

an upper food containing section comprising a horizontally disposed upper base member having an undulant periphery with a plurality of protrusions disposed thereon and extending outwardly in a spaced, equidistant, generally circumferential and symmetrical relationship relative to the center of the base member and between each undulation, a downwardly extending projection with an axial bore therein being disposed about the center of the upper base member, each protrusion containing a circular aperture of a diameter adapted to encompass a circular food dish therein, the food dish having a circular plate, an upwardly extending peripheral wall, and an outwardly extending annular flange at the upper terminus of the wall adapted to hold the food dish in proximate relationship to the base member upon the placement of the food dish with an aperture thereof;

a support member comprising a cylindrical tube having an unthreaded upper extent of a diameter to receive the projection of the upper base member, an unthreaded lower end of a diameter to receive the projection of the lower dish, and a threaded central extent therebetween; and a lower bolt extending through the axial bore of the lower dish and into the threaded central extent of the tube and an upper bolt extending through the axial bore of the upper base member and into the threaded central extent of the tube such that the upper base member and lower dish are maintained in fixed vertical alignment thereto.

2. An ant-free dish for use by pets comprising:

a lower dish positionable in a horizontal plane and defining a lower liquid reservoir therein, the lower dish having an upwardly extending projection about the center of the dish with an axial bore therethrough;

a horizontally disposed rotatable upper circular dish disposed vertically and in parallel relationship above the lower dish, the upper circular dish having upstanding walls across the diameter and about the periphery thereof, thus defining a plurality of wedge-shaped upper partitions therein, a downwardly extending projection with an axial bore therein being disposed about the center thereof, and a demountable cover member disposed thereover having a cutout which selectively exposes a single partition, the upper disk fixedly held about a stationary axial shaft extending downwardly through the center thereof such that it is rotatable about the vertical axis of the shaft;

a support member extending vertically between the lower dish and the upper dish wherein the support member contains an upper extent which receivingly engages the projection of the upper dish and a lower extent which receivingly engages the projection of the lower dish such that the support member allows for the lower dish and the upper dish to be maintained in fixed vertical alignment thereto.

3. An ant-free dish for use by pets comprising:

a lower dish positionable in a horizontal plane and defining a lower liquid reservoir therein, the lower dish having an upwardly extending projection about the center of the dish with an axial bore therethrough;

a horizontally disposed rotatable upper circular dish disposed vertically and in parallel relationship above the lower dish, the upper circular dish having upstanding walls across the diameter and about the periphery thereof, thus defining a plurality of wedge-shaped upper partitions therein, a downwardly extending projection with an axial bore therein being disposed about the center thereof, and a demountable cover member disposed thereover having a cutout which selectively exposes a single partition, the upper disk fixedly held about a stationary axial shaft extending downwardly through the center thereof such that it is rotatable about the vertical axis of the shaft;

a support member extending vertically between the lower dish and the upper circular dish wherein the support member contains an upper extent which receivingly engages the projection of the upper circular dish and a lower extent which receivingly engages the projection of the lower dish such that the support member allows for the lower dish and the upper circular dish to be maintained in fixed vertical alignment thereto, the support member having a motor assembly acting to impart rotation to the upper dish, the motor assembly comprising a timer, an electrical current supply, a switch, a toothed drive gear, a toothed idler gear, and a pair of antifriction rollers; and the stationary axial shaft connecting the motor assembly with the upper circular dish in parallel linkage; the upper dish further comprising along the bottom periphery thereof, a toothed ring gear in cooperating mesh with the idler gear of the motor assembly.

* * * * *